United States Patent

[11] 3,598,443

| [72] | Inventor | Robert W. Stoffel |
| | | Ferndale, Mich. |
| [21] | Appl. No. | 830,735 |
| [22] | Filed | June 5, 1969 |
| [45] | Patented | Aug. 10, 1971 |
| [73] | Assignee | Jim Robbins Seat Belt Co. |
| | | Mount Clemens, Mich. |

[54] SEAT BELT CONNECTOR
20 Claims, 6 Drawing Figs.

[52] U.S. Cl. .................................................... 297/389, 297/384
[51] Int. Cl. ................................................... A62b 35/60
[50] Field of Search ........................................ 24/230 IT, 211 M, 241 PS, 241 SL, 230.1 U; 297/389, 385

[56] References Cited
UNITED STATES PATENTS

| 3,179,997 | 4/1965 | Jalinaud | 24/230.1 (T) |
| 3,378,301 | 4/1968 | Ronianzi, Jr. et al. | 297/389 |
| 3,475,797 | 11/1969 | Rau | 24/230.1 (U) |
| 3,494,664 | 2/1970 | States | 24/230.1 (T) |

Primary Examiner—James T. McCall
Attorneys—Marvin Bressler and Jonathan Plaut

ABSTRACT: A seat belt assembly having a connector for releasably fastening a diagonally positioned shoulder belt to a lap belt, and both belts to a floor mounting fitting. The connector allows the user to either fasten or release the belts from their connection to the fitting as part of the same motion in which he positions or removes the belts from about his body.

PATENTED AUG 10 1971 3,598,443

INVENTOR
ROBERT W. STOFFEL
BY
Hauke Knass Gifford & Patalidis
Attorneys

PATENTED AUG 10 1971 3,598,443

INVENTOR
ROBERT W. STOFFEL
BY
Hauke Knass Gifford & Patalidis
Attorneys

SEAT BELT CONNECTOR

BACKGROUND OF THE INVENTION

1. Field of the Invention

This invention relates to safety seat belt assemblies, and more particularly to a connector for fastening either a lap belt or both a shoulder belt and a lap belt to a floor mounted fitting.

2. Description of Prior Art

Of the various forms of seat belt assemblies which employ both shoulder and lap belt elements, one arrangement has received special consideration. This arrangement employs a diagonal shoulder belt and a lap belt which has one end that is fastened with the lower end of the shoulder belt by a connector, and the connector with both belts is attached to a floor mounted fitting. The connector is intended to allow the user to either fasten or release the belts from the fitting by employing only one hand.

The advantages of such an arrangement over other configurations are reflected in a reduction in the belt length necessary to provide an effective body restraint and also in the total hardware that the user must manipulate in using the assembly. One such assembly is disclosed in U.S. Pat. No. 3,378,301 issued to L. Romanzi, Jr. et al.

The problem with prior art connectors employed for such assemblies is related to the manipulation necessary to either fasten or release the belts from their connection to the floor fixture. In addition, such prior art connectors are bulky, difficult to release or require numerous component parts.

SUMMARY OF THE INVENTION

The broad purpose of the present invention is to provide a novel form of seat belt connector that takes advantage of the motions that the user normally employs in manipulating the belt about his body. Preferably the floor-mounted fixture comprises an eye bolt, however, it could comprise a metal ring, or other similar element, which is mounted on the vehicle floor adjacent the seat assembly. The connector assembly comprises a baseplate carried at the end of the lap belt. Another plate carried on the end of the shoulder belt has an opening for receiving a stud carried by the lap belt to connect the two belts together.

A pair of spring-biased jaws are mounted on the baseplate for connecting the belts to the eye bolt. A cover encloses both jaws and carries a pin that is disposed in a straight slot in the baseplate, and a pair of curved slots in the jaws. The cover is movable on the baseplate from a position in which the pin is disposed in a central position in each of the three slots, toward either end of the baseplate. In the pin's central position, the two jaws are closed in a locking position. By moving the cover toward either end of the baseplate, both jaws are cammed open by the pin for either receiving or releasing the eye bolt.

The slot in the baseplate is aligned with the lap belt to permit the user to form a connection between the belts and the eye bolt by the same motion in which he positions the belts about his body. As the connector is lowered toward the eye bolt, the cover is moved toward one end of the baseplate to open the jaws until the eye bolt is disposed between them. The jaws are then closed to lock the eye bolt as the cover is returned to its central position on the baseplate. To disconnect the belts from the floor, the user raises the connector in a motion in which the cover is moved toward the other end of the baseplate to open the jaws and release the eye bolt.

In addition to its easier manipulation, another advantage of the preferred connector is that the stud provides means for connecting the two belts together without increasing the number of openings in the baseplate. The baseplate, therefore, has a minimum of stress points.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
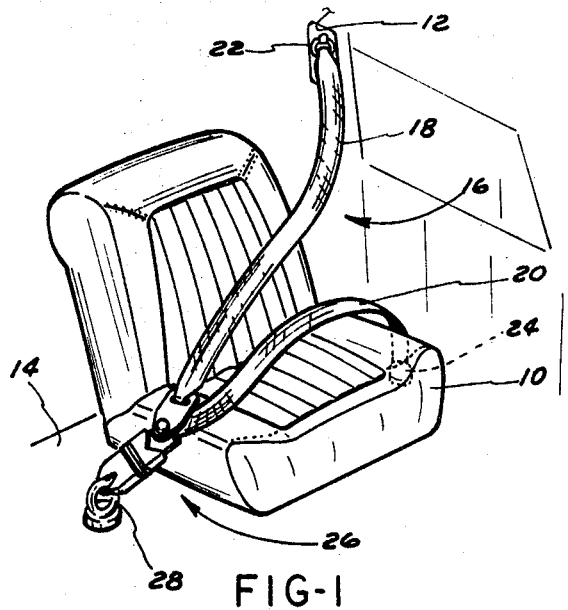
FIG. 1 is a perspective view showing a seat assembly in the passenger compartment of a vehicle, and a seat belt assembly illustrating a preferred embodiment of the invention.

Referring to the drawings, FIG. 1 illustrates a seat assembly 10 in the passenger compartment of a vehicle 12, mounted on a floor panel 14. A preferred seat belt assembly, illustrated at 16, comprises a shoulder belt 18 and a lap belt 20. A fitting 22 connects the upper end of the shoulder belt to the vehicle adjacent the seat assembly 10. Similarly, a fitting 24, on the same side of the seat assembly 10 as fitting 22, anchors one end of the lap belt to the floor panel 14. The fitting 22 is mounted such that the shoulder belt is diagonally disposed across the user when its lower end is connected to the floor panel 14 on the opposite side of seat assembly 10. It is apparent that if preferred the fitting 22 could be replaced by a retractor device which biases the shoulder belt toward a stored position, or it could be mounted on the back of the seat assembly.

Figure 2:
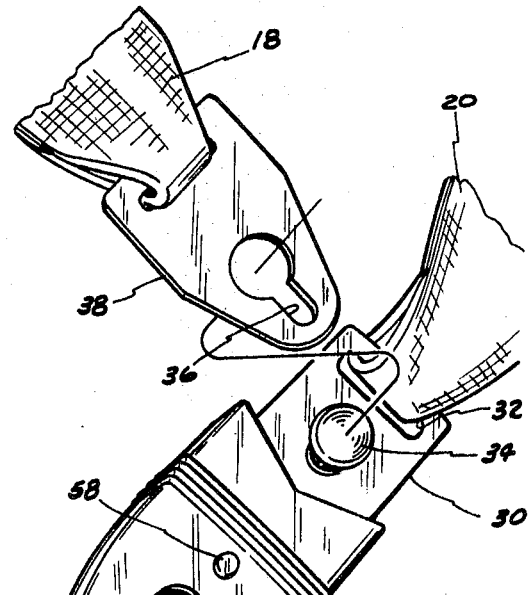
FIG. 2 is an enlarged perspective view showing a preferred connector of the assembly disconnected from both the shoulder belt and the eye bolt.
Figure 3:
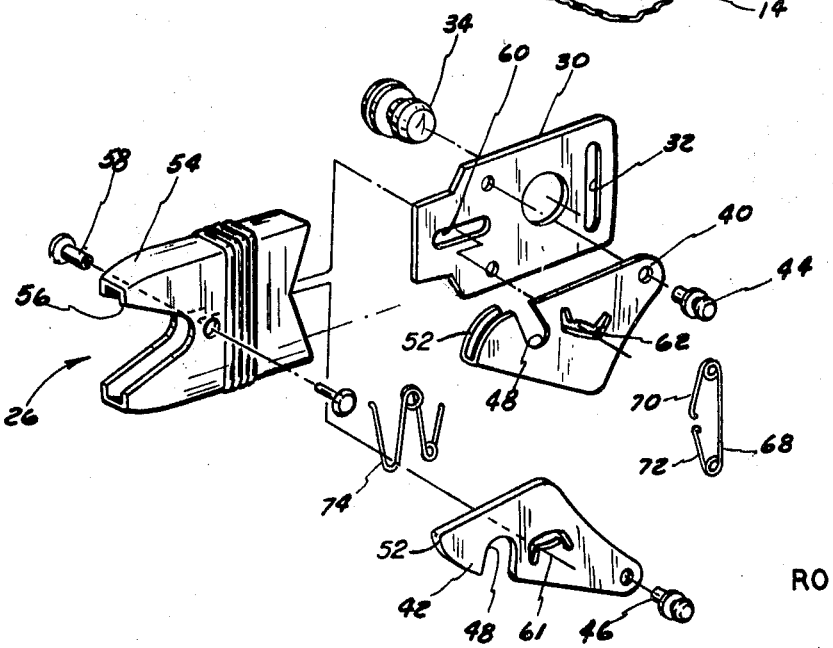
FIG. 3 is an exploded view of the preferred connector.

A connector 26 provides means for releasably fastening the shoulder belt 18 to the lap belt 20, and for fastening either the lap belt alone, or both belts to a floor-mounted eye bolt 28. As is more clearly illustrated in FIGS. 2 and 3, the connector 26 comprises an elongated, flat baseplate 30 having a slot 32 for receiving the looped end of the lap belt 20. A stud 34 is mounted on the baseplate 30, and has an enlarged head adapted to be passed through a keyhole-shaped opening 36 in a plate 38 carried by the shoulder belt 18. The large end of opening 36 receives the stud 34 which is then moved toward the narrow end of the opening to form a connection between the two belts.

One advantage of this particular structure for connecting the shoulder belt 18 to the lap belt 20 is that it does not require the two belts to be disposed at any predetermined angular relationship to make the connection.

Figure 4:
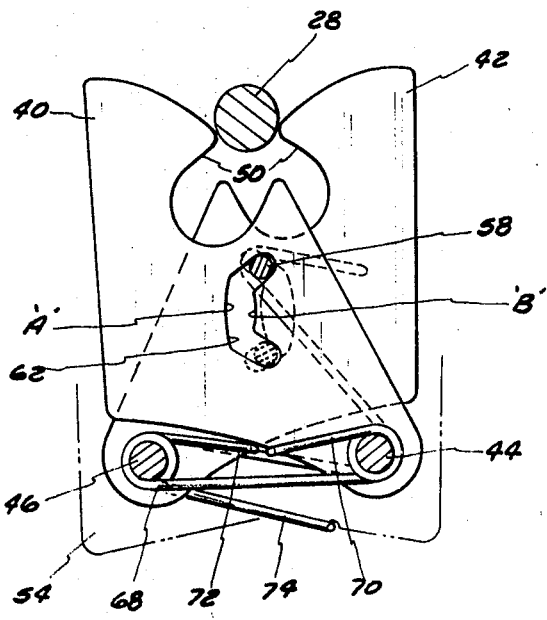
FIG. 4 is a fragmentary view showing the connector jaws in their open position.
Figure 5:
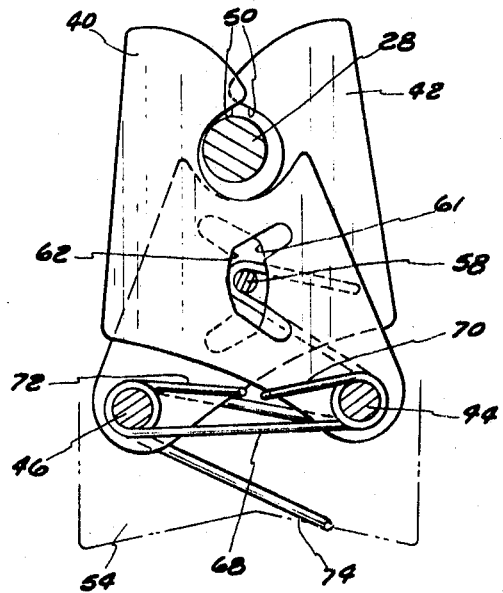
FIG. 5 is a view similar to FIG. 4 but showing the jaws closed in their locking position.
Figure 6:
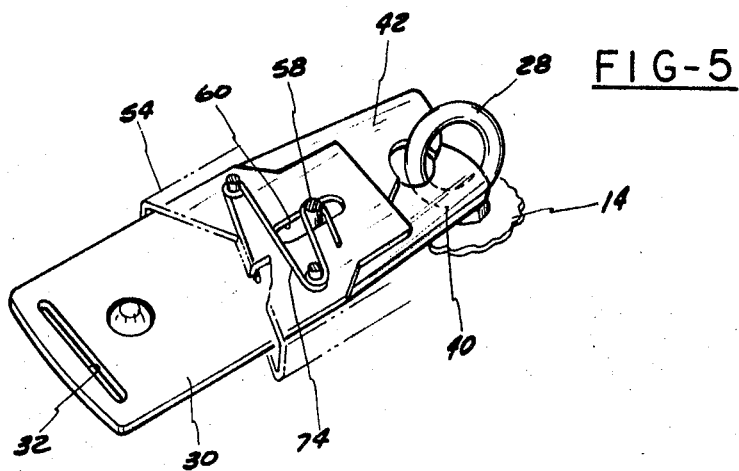
FIG. 6 is a view of the connector similar to FIG. 2, but in which the jaws have been released from the eye bolt, and the cover is shown in phantom.

The connector 26 further comprises a pair of jaws 40 and 42 for locking the baseplate 30 to the eye bolt 28. Jaws 40 and 42 are connected by, respectively, pivots 44 and 46 to the baseplate 30 so as to be pivotal parallel to the baseplate. Each jaw has an opening 48 along its back edge supported beyond the end of the baseplate 30. As best illustrated in FIGS. 4 and 5, the two jaws are movable on the baseplate between an open position, illustrated in FIG. 4, in which the openings 48 are spaced from one another to receive the eye bolt 28 between them, and a closed position, illustrated in FIG. 5, in which the openings 48 form a socket for the eye bolt which prevents its separation from the baseplate 30.

It is to be noted that the two jaws 40 and 42 are substantially flat, however, the tip of jaw 40 has a fold for receiving the tip of jaw 42. In addition, the two jaws 40 and 42 cross another so that each is moved toward the pivot of the other jaw as it is pivoted toward its open position. Each opening 48 has a straight outer edge 50 which is substantially tangential to its pivotal axis. Thus, when the two jaws are closed, as shown in FIG. 5, a motion tending to remove the baseplate 30 away from the eye bolt will bring the eye bolt into contact with the edges 50 in a position in which the relative motion of the eye bolt does not have a turning component on the jaws.

Each of the jaws 40 and 42 has a cammed outer edge 52 for contacting the eye bolt 28 when the jaws are to receive the eye bolt. The edges 52 are formed such that as the baseplate is moved toward the eye bolt, the eye bolt develops a turning component on each jaw which tends to open it.

A hollow cover 54 is mounted on the baseplate 30, and houses a major portion of the two jaws 40 and 42. The cover 54 has an opening 56 which exposes the outer ends of the two jaws. A pin 58, carried by the cover 54, is disposed in a straight longitudinal slot 60 in the baseplate 30. The pin 58 is also disposed in a slot 61 in the jaw 42, and a slot 62 in the jaw member 40. The slots 61 and 62 are formed in such a manner that as the cover 54 is moved from a position in which the pin 58 is in the midsection of slot 60, toward either end of the baseplate 30, the jaws 40 and 42 are opened from their closed positions. Thus, the cover 54 and pin 58 function as actuating means for the user to open and close the jaws.

A spring 68 is mounted on pivots 44 and 46, and has a pair of arms 70 and 72 biasing the jaws 40 and 42 toward their closed positions. A second spring 74 is connected between the pin 58 and cover 54 to bias the cover toward the position it occupies when the jaws are closed.

Referring to FIGS. 4 and 5, the cover 54 is normally in its intermediate locked position, illustrated in FIG. 5, in which the pin 58 is disposed in the midsection of slots 60, 61 and 62, and the jaws 40 and 42 are closed. By moving the cover 54 toward either end of the baseplate 30, the user can open the jaws to either receive or release the eye bolt. When the user releases the cover, the springs 68 and 74 return the jaws toward their closed position and the cover toward its central, locked position.

The midsection of the slots 61 and 62 are formed with a special configuration in order to assist the springs 68 and 74, and the cover 54 in opening and closing the jaws. The front side edge of each of the two slots i.e. the edge which is in contact with the pin 58 when the baseplate 30 is not being pulled away from the eye bolt 28, has a prominent curvature as at "A" in FIG. 4. This curvature encourages the pin 58 to slide toward its central position in the slot in each jaw.

The opposite side edge of the slots 61 and 62, that is the edge that is in contact with the pin 58 when a force which is not applied through a cover motion, tends to open the jaws, also has a slight curvature. Under such a loading condition, the slight curvature, as shown at "B" in FIG. 4, tends to centralize the pin in the slots to prevent the jaws from being opened.

In summary, it is to be understood that I have described in detail a seat belt connector in which the user can open the jaws 40 and 42 for receiving the eye bolt as a part of the same motion in which he positions the seat belt 18 and 20 about his body, and also open the jaws for releasing the eye bolt as a part of the same motion in which he removes the belts from his body.

Having thus described my invention, I claim:

1. A seat belt connecting means comprising:
a fitting,
a base member,
a locking member pivotally mounted on the base member so as to be pivotal thereon between an open position to permit receiving and releasing the fitting and a closed position for locking said fitting to said base member,
actuating means slidably mounted on said base member and normally disposed at an intermediate position with respect to said base member,
said actuating means being operably connected to said locking member to pivot said locking member from said closed position when said actuating means is in said intermediate position to said open position of said locking member when said actuating means is moved in either direction from said intermediate position.

2. The connecting means as defined in claim 1 and including bias means carried by said base member and urging said locking member toward the closed position.

3. The combination as defined in claim 1 and in which said actuating means includes a cover member slidably carried by said baseplate, and a pin member carried by said cover and extending through elongated slots formed in said baseplate and said locking member.

4. In a seat belt connector, the combination comprising:
a fitting,
a base member,
a pair of locking members pivotally mounted on the base member so as to be pivotal between an open position to permit receiving and releasing the fitting and a closed position for locking said fitting to said base member,
actuating means slidably connected to said locking members to pivot them intermediate said open and closed positions upon sliding movement of said actuating means with respect to said base member.

5. The combination as defined in claim 4, including a bias member for urging the locking members toward the closed position.

6. The combination as defined in claim 4, in which the base member has a planar surface, and the locking members are pivotal about axes normal to said surface.

7. The combination as defined in claim 6, in which said actuating means is slidable along a path parallel to the base member.

8. The combination as defined in claim 4, and in which said actuating means comprises a cover member encompassing said locking members and a pin member extending through said base member, said locking members and said cover member, said base member and said locking members having elongated slots for receiving said pin.

9. The combination as defined in claim 8, and in which said locking member slots are C-shaped and face in opposite directions whereby movement of said pin into the end portions of said slots causes said locking members to pivot toward said open position.

10. The combination as defined in claim 4, in which each of the locking members has an opening for receiving a portion of the fitting in the closed position.

11. The combination as defined in claim 4, in which said fitting is elongated and is disposed when locked to said base member by said locking members generally perpendicular to said base member.

12. In a vehicle having a seat assembly, the combination comprising:
a shoulder belt and means anchoring said shoulder belt to the vehicle adjacent one side of the seat assembly,
a lap belt and means anchoring said lap belt to the vehicle adjacent the same side of the seat assembly as the shoulder belt,
a connector ring anchored to the vehicle adjacent the opposite side of the seat assembly as said anchoring means,
a baseplate connected to the lap belt,
a stud mounted on the baseplate,
hardware carried by the shoulder belt for engaging the stud to connect the belts together,
a locking member carried on the baseplate so as to be pivotal thereon between a closed position for locking the connecting ring to the baseplate and an open position for receiving and releasing the connector ring from the baseplate,
a bias member connected to the locking member for urging it towards its locking position, and
actuating means movably carried on the baseplate, and connected to the locking member such that the locking member can be moved from its closed position toward its open position by disposing the locking member in contact with the connector ring, and then moving the actuating means toward the connector ring.

13. The combination as defined in claim 12, in which the actuating means is mounted on the baseplate so as to be movable thereon in opposite directions from an intermediate position, and is connected to the locking member to move it toward its open position from its closed position as the actuating means is moved in either of said directions from said intermediate position.

14. The combination as defined in claim 12, in which the hardware carried by the shoulder belt has an opening for receiving the stud and is movable to a position in which it forms a locking connection between the two belts.

15. The combination as defined in claim 12, including a second locking member carried on the baseplate so as to be pivotal with respect to the baseplate between an open position and a closed position and each of said locking members having an opening for receiving the connector ring in the closed position of said locking member.

16. The combination as defined in claim 15, in which the locking members have cam surfaces formed such that as the baseplate and the connector ring are moved toward one another with the cam surfaces in contact with the connector ring, the locking members are cammed by the connector ring toward their open positions.

17. The combination as defined in claim 15, in which the connector ring has an opening, and the two locking members are receivable into the opening of the ring in opposite directions as the locking members are moved toward their closed positions.

18. In a vehicle having a seat assembly, the combination comprising:
- a shoulder belt and means anchoring said shoulder belt to the vehicle adjacent one side of the seat assembly,
- a lap belt and means anchoring said shoulder belt to the vehicle adjacent the same side of the seat assembly as the shoulder belt,
- a connector ring anchored to the vehicle adjacent the opposite lateral side of the seat assembly as said anchoring means,
- a baseplate connected to the lap belt,
- means carried by said baseplate and said shoulder belt for releasably locking said baseplate to said shoulder and means carried by said baseplate for releasably locking said baseplate to said connector ring, said last-mentioned means comprising a pair of locking members each pivotally mounted to said baseplate,
- said locking means each having an opening for receiving said connector ring and only pivotal intermediate an open position wherein said openings are separated and closed position wherein said connector ring can be locked in place in said openings,
- said locking members having portions overlying one another and elongated slots being formed in said portions,
- an elongated slot formed in said base member and pin member extending through said slots, said slots being formed such that movement of said pin with respect to said slots cam said locking members intermediate the closed and the open positions, and
- a cover member covering a portion of said locking members and carrying said pin.

19. The combination as defined in claim 18, and in which said locking member slots are substantially C-shaped and face in opposite directions whereby movement of said pin into either end portion of said slots causes said locking member to pivot toward said open position.

20. The combination as defined in claim 18 and including biasing means urging said locking member toward said closed position.